United States Patent
Katayama et al.

(10) Patent No.: US 10,411,585 B2
(45) Date of Patent: Sep. 10, 2019

(54) INVERTER SYSTEM, INVERTER APPARATUS, AND METHOD OF CONTROLLING INVERTER SYSTEM

(71) Applicants: KABUSHIKI KAISHA YASKAWA DENKI, Kitakyushu-shi (JP); Yaskawa America, Inc., Waukegan, IL (US)

(72) Inventors: Taisuke Katayama, Gurnee, IL (US); Eiji Yamamoto, Kitakyushu (JP); Kenji Mitsuda, Kitakyushu (JP); Hiroshi Takagi, Kitakyushu (JP); Thomas Bryan Sasada, Gurnee, IL (US)

(73) Assignees: KABUSHIKI KAISHA YASKAWA DENKI, Kitakyushu-Shi (JP); YASKAWA AMERICA, INC., Waukegan, IL (US)

( * ) Notice: Subject to any disclaimer, the term of this patent is extended or adjusted under 35 U.S.C. 154(b) by 1095 days.

(21) Appl. No.: 14/298,947

(22) Filed: Jun. 8, 2014

(65) Prior Publication Data

US 2015/0357903 A1 Dec. 10, 2015

(51) Int. Cl.
*H02M 1/14* (2006.01)
*H02M 7/23* (2006.01)
(Continued)

(52) U.S. Cl.
CPC ........... *H02M 1/143* (2013.01); *H02M 5/458* (2013.01); *H02M 7/062* (2013.01); *Y10T 307/50* (2015.04)

(58) Field of Classification Search
CPC ...... H02M 1/143; H02M 5/458; H02M 7/062; Y10T 307/50
(Continued)

(56) References Cited

U.S. PATENT DOCUMENTS

| 5,625,545 A | 4/1997 | Hammond |
| 2007/0064366 A1* | 3/2007 | Hammond ............ H02H 9/001 361/93.1 |

(Continued)

FOREIGN PATENT DOCUMENTS

| CN | 201966812 U | 9/2011 |
| CN | 203014685 U | 6/2013 |

(Continued)

OTHER PUBLICATIONS

Chinese Office Action for corresponding CN Application No. 201510300561.8, dated Jun. 15, 2017.
(Continued)

*Primary Examiner* — Rexford N Barnie
*Assistant Examiner* — Thai H Tran
(74) *Attorney, Agent, or Firm* — Mori & Ward, LLP

(57) ABSTRACT

An inverter system includes an inverter apparatus and a smoothing capacitor charging-power apparatus. The inverter apparatus includes a transformer and an inverter cell. The transformer includes primary windings and secondary windings. Each of the inverter cells includes a converter circuit, a smoothing capacitor, and an inverter circuit. The converter circuit is configured to convert an intermediate alternating-current voltage to a direct-current voltage. The smoothing capacitor is configured to smooth the direct-current voltage. The inverter circuit is configured to at least partially generate a phase voltage of a variable alternating-current voltage from the direct-current voltage smoothed by the smoothing capacitor. Electric power is to be supplied from a second power supply different from a first power supply to the smoothing capacitor charging-power apparatus. The smoothing capacitor charging-power apparatus is electrically connected to the primary windings to supply initial (Continued)

charging power to the smoothing capacitor via the primary windings and the secondary windings.

26 Claims, 12 Drawing Sheets

(51) Int. Cl.
  *H02M 5/458* (2006.01)
  *H02M 7/06* (2006.01)
(58) Field of Classification Search
  USPC .......................................................... 307/43
  See application file for complete search history.

(56) References Cited

U.S. PATENT DOCUMENTS

| | | | | |
|---|---|---|---|---|
| 2007/0205729 | A1* | 9/2007 | Garbowicz | H05B 41/46 315/299 |
| 2009/0284999 | A1* | 11/2009 | Gibbs | H02M 7/062 363/65 |
| 2010/0213921 | A1* | 8/2010 | Abolhassani | H01F 27/385 323/328 |
| 2012/0181955 | A1* | 7/2012 | Sodo | H02M 1/32 318/375 |

FOREIGN PATENT DOCUMENTS

| | | |
|---|---|---|
| JP | 52-41875 | 3/1977 |
| JP | 2002-345258 | 11/2002 |
| JP | 2002-354830 | 12/2002 |
| JP | 2006-129571 | 5/2006 |
| JP | 2011-239581 | 11/2011 |

OTHER PUBLICATIONS

Japanese Office Action for corresponding JP Application No. 2015-113825, dated Oct. 2, 2018 (w/ English machine translation).
Japanese Office Action for corresponding JP Application No. 2015-113825, dated May 21, 2019 (w/ English machine translation).

* cited by examiner

| RATED VOLTAGE ON PRIMARY SIDE OF TRANSFORMER[V] | TRANSFORMER 5% TAP VOLTAGE[V] | VOLTAGE CLASS OF CHARGING INVERTER |
|---|---|---|
| 2400 | 120 | 200V CLASS |
| 3000 | 150 | 200V CLASS |
| 3300 | 165 | 200V CLASS |
| 4160 | 208 | 200V OR 400V CLASS |
| 6000 | 300 | 400V CLASS |
| 6600 | 330 | 400V CLASS |
| 11000 | 550 | 400V CLASS |

FIG. 7

INVERTER SYSTEM, INVERTER APPARATUS, AND METHOD OF CONTROLLING INVERTER SYSTEM

BACKGROUND OF THE INVENTION

Field of the Invention

The present invention relates to an inverter system, an inverter apparatus, and a method of controlling the inverter system.

Discussion of the Background

An inverter cell provided in an inverter apparatus includes a smoothing capacitor to smooth a direct-current (DC) voltage which is converted from an alternating-current (AC) voltage by a converter circuit of the inverter cell. The smoothing capacitor needs to be charged first in order to operate for smoothing the DC voltage.

However, the smoothing capacitor is not charged when the inverter apparatus is first energized.

Thus, the technology for initially charging the smoothing capacitor has been disclosed in Japanese published unexamined application 2002-345258, for example.

SUMMARY OF THE INVENTION

According to one aspect of the present invention, an inverter system includes an inverter apparatus and a smoothing capacitor charging-power apparatus. The inverter apparatus includes a transformer and inverter cells. The transformer includes primary windings and secondary windings. An input alternating-current voltage is to be supplied from a first power supply to the primary windings. The secondary windings are configured to be electromagnetically connected to the primary windings to generate an intermediate alternating-current voltage. The inverter cells are configured to generate a variable alternating-current voltage from the intermediate alternating-current voltage. Each of the inverter cells includes a converter circuit, a smoothing capacitor, and an inverter circuit. The converter circuit is configured to convert the intermediate alternating-current voltage to a direct-current voltage. The smoothing capacitor is configured to smooth the direct-current voltage. The inverter circuit is configured to at least partially generate a phase voltage of the variable alternating-current voltage from the direct-current voltage smoothed by the smoothing capacitor. Electric power is to be supplied from a second power supply different from the first power supply to the smoothing capacitor charging-power apparatus. The smoothing capacitor charging-power apparatus is electrically connected to the primary windings to supply initial charging power to the smoothing capacitor via the primary windings and the secondary windings.

According to another aspect of the present invention, an inverter apparatus includes a transformer, inverter cells, and an initial-charging controller. The transformer includes primary windings and secondary windings. An input alternating-current voltage is to be supplied from a first power supply to the primary windings. The secondary windings are configured to be electromagnetically connected to the primary windings to generate an intermediate alternating-current voltage. The inverter cells are configured to generate a variable alternating-current voltage from the intermediate alternating-current voltage. Each of the inverter cells includes a converter circuit, a smoothing capacitor, and an inverter circuit. The converter circuit is configured to convert the intermediate alternating-current voltage to a direct-current voltage. The smoothing capacitor is configured to smooth the direct-current voltage. The inverter circuit is configured to at least partially generate a phase voltage of the variable alternating-current voltage from the direct-current voltage smoothed by the smoothing capacitor. The initial-charging controller is configured to control a smoothing capacitor charging-power apparatus to supply initial charging power to the smoothing capacitor via the primary windings and the secondary windings using electric power supplied from a second power supply different from the first power supply.

According to further aspect of the present invention, in a method of controlling an inverter system, an input alternating-current voltage is supplied from a first power supply to primary windings of a transformer of the inverter system to generate a variable alternating-current voltage using inverter cells of the inverter system. The transformer includes secondary windings configured to be electromagnetically connected to the primary windings. Initial charging power is supplied to a smoothing capacitor provided in each of the inverter cells via the primary windings and the secondary windings using electric power supplied from a second power supply different from the first power supply prior to the supplying of the input alternating-current voltage.

According to the other aspect of the present invention, an inverter system includes an inverter apparatus and a smoothing capacitor charging-power apparatus. The inverter apparatus includes a transformer and inverter cells. The transformer includes primary windings and secondary windings. The primary windings each include an input terminal, a first terminal, and a second terminal. An input alternating-current voltage is to be supplied via the input terminal. The first terminal defines a first number of turns of each of the primary windings between the input terminal and the first terminal. The second terminal defines a second number of turns of each of the primary windings between the input terminal and the second terminal. The second number of turns is different from the first number of turns. The secondary windings are configured to be electromagnetically connected to the primary windings to generate an intermediate alternating-current voltage. The inverter cells are configured to generate a variable alternating-current voltage from the intermediate alternating-current voltage. Each of the inverter cells includes a converter circuit, a smoothing capacitor, and an inverter circuit. The converter circuit is configured to convert the intermediate alternating-current voltage to a direct-current voltage. The smoothing capacitor is configured to smooth the direct-current voltage. The inverter circuit is configured to at least partially generate a phase voltage of the variable alternating-current voltage from the direct-current voltage smoothed by the smoothing capacitor. The smoothing capacitor charging-power apparatus is electrically connected to the second terminal and is configured to supply initial charging power to the smoothing capacitor via the second terminal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 shows examples of voltage classes of a charging inverter provided in the inverter system illustrated in FIG. 1;

DESCRIPTION OF THE EMBODIMENTS

Figure 1:
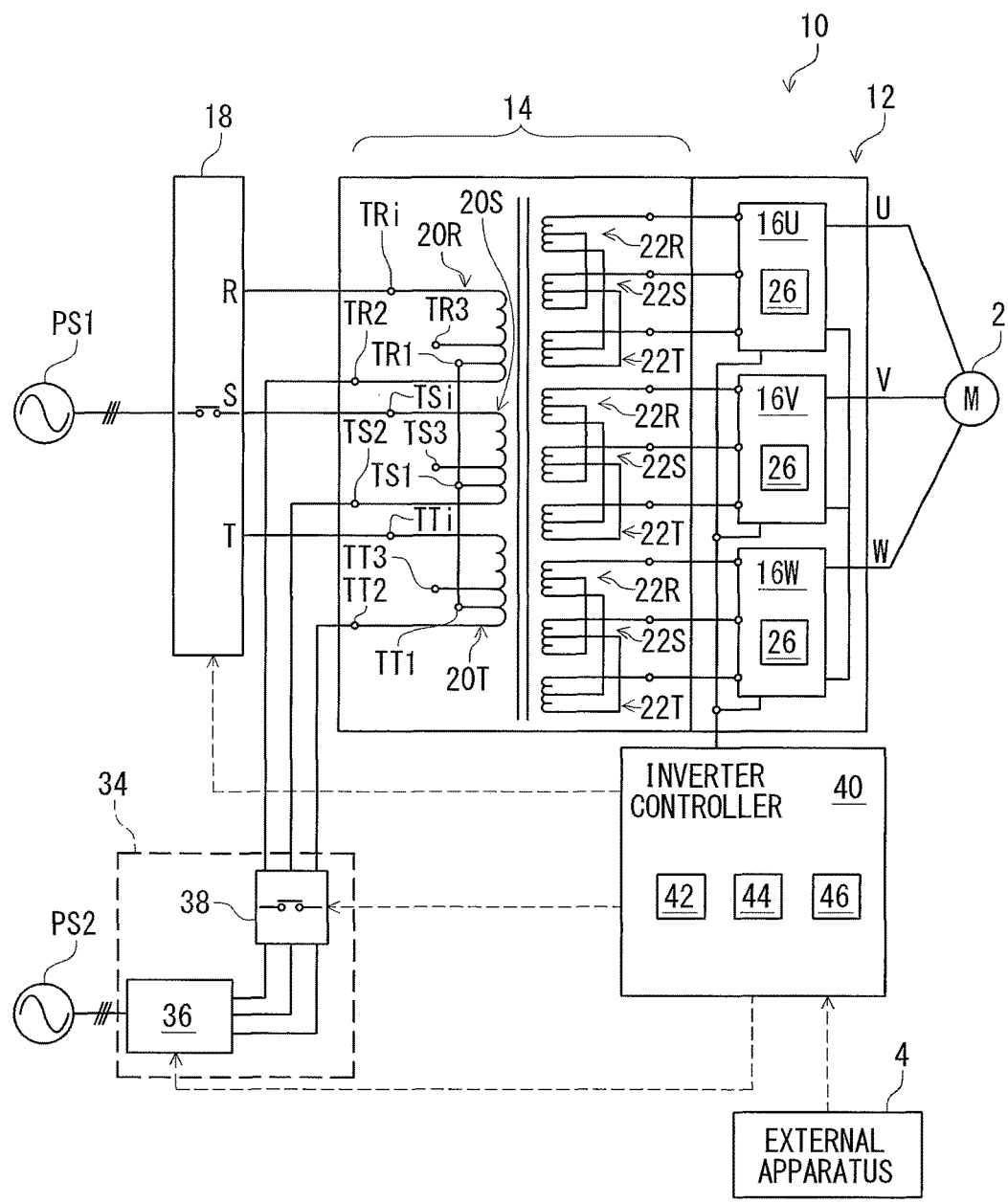
FIG. 1 is a schematic block diagram showing an outline of an inverter system according to a first embodiment.

The embodiments will now be described with reference to the accompanying drawings, wherein like reference numerals designate corresponding or identical elements throughout the various drawings.

First Embodiment

Referring initially to FIG. 1, an inverter system 10 according to a first embodiment is configured to generate variable alternating-current (AC) power based on input AC power supplied from a first power supply PS1. In the illustrated embodiment, the inverter system 10 is a multiple inverter system configured to generate a variable three-phase AC voltage having U-phase, V-phase and W-phase based on a three-phase input AC voltage having R-phase, S-phase and T-phase. However, the input AC voltage can have at least two phases. The inverter system 10 is electrically connected to an AC load such as an AC motor 2. Operating commands such as a start command, a stop command and a voltage command are input from an external apparatus 4. Possible examples of the external apparatus 4 include an operating apparatus configured to be operated by a user for controlling the inverter system 10 and the AC motor 2.

As seen in FIG. 1, the inverter system 10 includes an inverter apparatus 12. The inverter apparatus 12 includes a transformer 14 and inverter cells 16U, 16V and 16W. The transformer 14 is electrically connected to the first power supply PS1 via a main switch circuit 18. The input AC voltage is supplied from the first power supply PS1 to the transformer 14 of the inverter apparatus 12 via the main switch circuit 18. The main switch circuit 18 is configured to electrically connect and disconnect the inverter apparatus 12 to and from the first power supply PS1 in response to signals from the inverter controller 40. The main switch circuit 18 includes an electromagnetic switch configured to close in response to a closing signal. Other switch circuits can, however, be provided between the first power supply PS1 and the inverter apparatus 12 if needed and/or desired.

As seen in FIG. 1, the transformer 14 includes primary windings 20R, 20S and 20T. The primary windings 20R, 20S and 20T are electrically connected to the first power supply PS1 via the main switch circuit 18. The input AC voltage is supplied from the first power supply PS1 to the primary windings 20R, 20S and 20T. The primary windings 20R, 20S and 20T correspond to R-phase, S-phase, and T-phase of the input AC voltage, respectively.

The primary winding 20R includes an input terminal TRi, a neutral terminal TR1 (one example of a first terminal), and a first tap TR2 (one example of a second terminal). The primary winding 20S includes an input terminal TSi, a neutral terminal TS1 (one example of a first terminal), and a first tap TS2 (one example of a second terminal). The primary winding 20T includes an input terminal TTi, a neutral terminal TT1 (one example of a first terminal), and a first tap TT2 (one example of a second terminal). The input AC voltage is supplied from the first power supply PS1 via the input terminals TRi, TSi and TTi to the primary windings 20R, 20S and 20T.

The neutral terminal TR1 defines a first number of turns NR1 of the primary winding 20R between the input terminal TRi and the neutral terminal TR1. The neutral terminal TS1 defines a first number of turns NS1 of the primary winding 20S between the input terminal TSi and the neutral terminal TS1. The neutral terminal TT1 defines a first number of turns NT1 of the primary winding 20T between the input terminal TTi and the neutral terminal TT1. In the illustrated embodiment, the neutral terminals TR1, TS1 and TT1 are electrically connected to each other to serve as neutral points.

The first tap TR2 defines a second number of turns NR2 of the primary winding 20R between the input terminal TRi and the first tap TR2. The first tap TS2 defines a second number of turns NS2 of the primary winding 20S between the input terminal TSi and the first tap TS2. The first tap TT2 defines a second number of turns NT2 of the primary winding 20T between the input terminal TTi and the first tap TT2. The second number of turns NR2 is different from the first number of turns NR1. The second number of turns NS2 is different from the first number of turns NS1. The second number of turns NT2 is different from the first number of turns NT1. In the illustrated embodiment, the second number of turns NR2 is greater than the first number of turns NR1. The second number of turns NS2 is greater than the first number of turns NS1. The second number of turns NT2 is greater than the first number of turns NT1. Namely, the first taps TR2, TS2 and TT2 can serve as plus taps (e.g., +5% tap).

The primary winding 20R further includes a second tap TR3 (one example of a third terminal) defining a third number of turns NR3 between the input terminal TRi and the second tap TR3. The primary winding 20S further includes a second tap TS3 (one example of a third terminal) defining a third number of turns NS3 between the input terminal TSi and the second tap TS3. The primary winding 20T further includes a second tap TT3 (one example of a third terminal) defining a third number of turns NT3 between the input terminal TTi and the second tap TT3. In the illustrated embodiment, the third number of turns NR3 is less than the first number of turns NR1. The third number of turns NS3 is less than the first number of turns NS1. The third number of turns NT3 is less than the first number of turns NT1. Namely, the second taps TR3, TS3 and TT3 can serve as minus taps (e.g., −5% tap).

Figure 2:
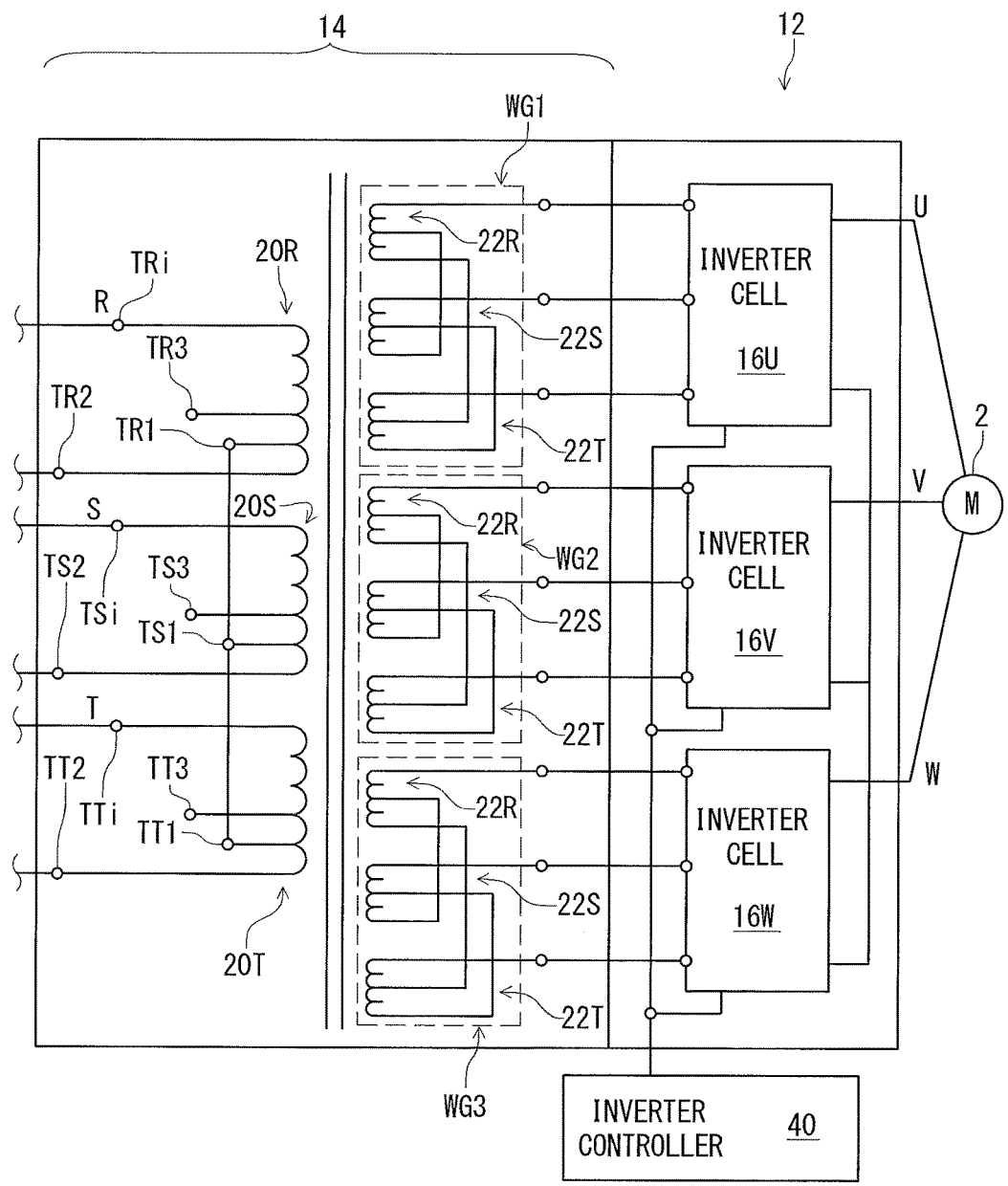
FIG. 2 is a schematic diagram of a transformer provided in the inverter system illustrated in FIG. 1.

As seen in FIG. 2, the transformer 14 includes secondary windings 22R, 22S and 22T. In the illustrated embodiment, the transformer 14 includes three secondary-winding groups WG1, WG2 and WG3 corresponding to U-phase, V-phase and W-phase of the variable AC voltage supplied to the AC motor 2. Each of the three secondary-winding groups WG1, WG2 and WG3 includes the secondary windings 22R, 22S and 22T corresponding to R-phase, S-phase and T-phase of the input AC voltage.

The secondary windings 22R, 22S and 22T of each of the secondary-winding groups WG1, WG2 and WG3 are configured to be electromagnetically connected to the primary windings 20R, 20S and 20T to generate an intermediate AC voltage. The secondary windings 22R, 22S and 22T of the secondary-winding group WG1 are electrically connected to the inverter cell 16U. The secondary windings 22R, 22S and 22T of the secondary-winding group WG2 are electrically connected to the inverter cell 16V. The secondary windings 22R, 22S and 22T of the secondary-winding group WG3 are electrically connected to the inverter cell 16W. The inverter cells 16U, 16V and 16W are electrically connected in series. The inverter cells 16U, 16V and 16W are configured to generate the variable AC voltage from the intermediate AC voltage.

Figure 3:
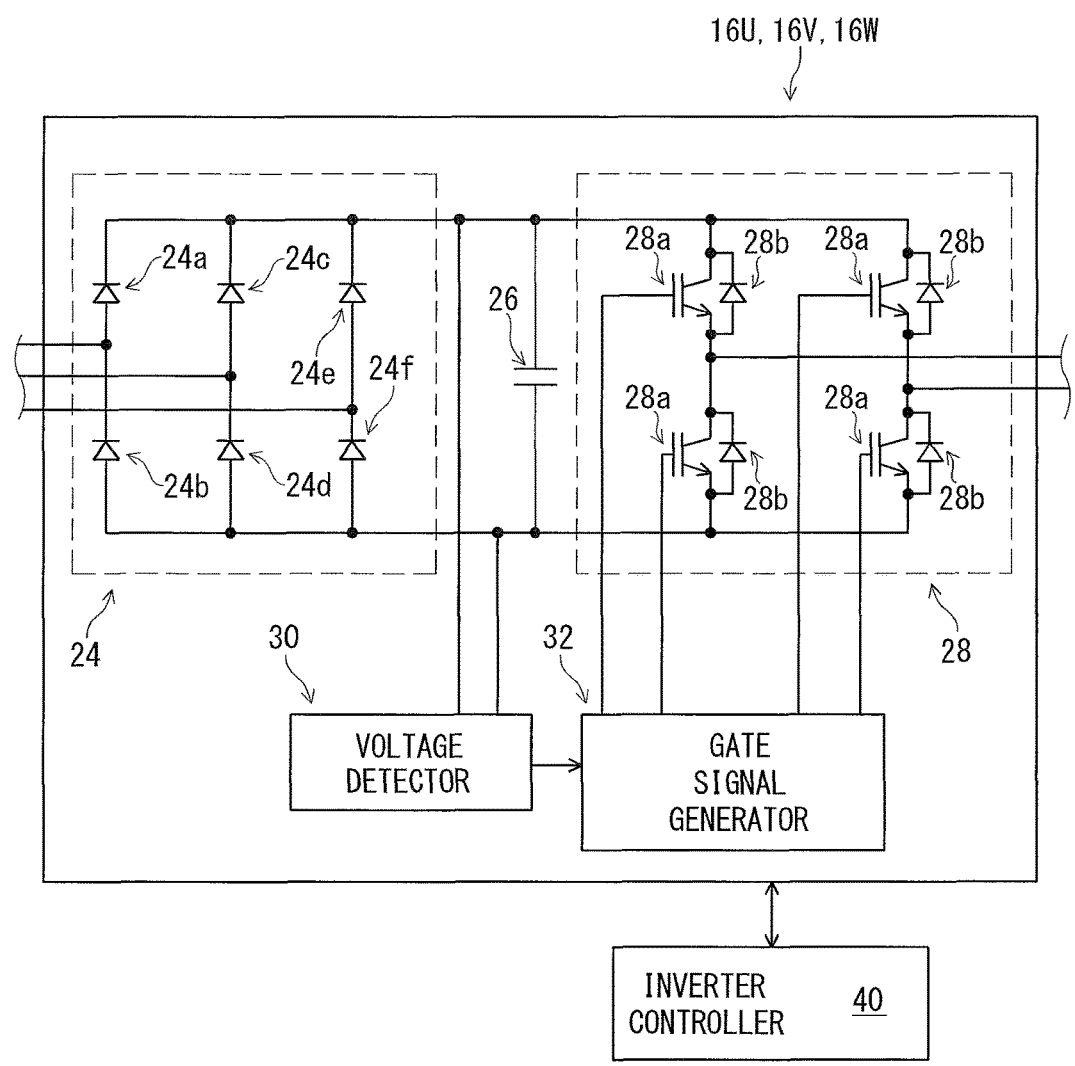
FIG. 3 is a schematic diagram of an inverter cell provided in the inverter system illustrated in FIG. 1.

As seen in FIG. 3, each of the inverter cells 16U, 16V and 16W includes a converter circuit 24, a smoothing capacitor 26, and an inverter circuit 28. The converter circuit 24 is configured to convert the intermediate AC voltage to a direct-current (DC) voltage. The smoothing capacitor 26 is configured to smooth the DC voltage. The inverter circuit 28 is configured to generate a phase voltage of the variable AC voltage from the DC voltage smoothed by the smoothing capacitor 26.

The inverter circuit 28 of the inverter cell 16U is configured to generate a U-phase voltage of the variable AC voltage from the intermediate AC voltage. The inverter circuit 28 of the inverter cell 16V is configured to generate a V-phase voltage of the variable AC voltage from the intermediate AC voltage. The inverter circuit 28 of the inverter cell 16W is configured to generate a W-phase voltage of the variable AC voltage from the intermediate AC voltage. As seen in FIG. 3, the inverter circuit 28 of each of the inverter cells 16U, 16V and 16W includes transistors 28a and flywheel diodes 28b, for example. The transistors 28a are configured to turn on and off in response to gate signals. The flywheel diodes 28b are configured to respectively protect the transistors 28a.

Each of the inverter cells 16U, 16V and 16W includes a voltage detector 30 configured to detect a voltage (i.e., a P-N voltage) Vpn across the smoothing capacitor 26. Each of the inverter cells 16U, 16V and 16W further includes a gate-signal generator 32 configured to generate gate signals using the voltage Vpn to perform a pulse width modulation (PWM) control. The transistors 28a of each of the inverter cells 16U, 16V and 16W turn on and off in response to the gate signals generated by the gate-signal generator 32. In the illustrated embodiment, the voltage Vpn is also used to control initial charging of the smoothing capacitor 26.

As seen in FIG. 1, the inverter system 10 includes a smoothing capacitor charging-power apparatus 34 electrically connected to the primary windings 20R, 20S and 20T to supply initial charging power to the smoothing capacitor 26 via the primary windings 20R, 20S and 20T and the secondary windings 22R, 22S and 22T. In the illustrated embodiment, the smoothing capacitor charging-power apparatus 34 is electrically connected to the first taps TR2, TS2 and TT2. The smoothing capacitor charging-power apparatus 34 is configured to supply the initial charging power to the smoothing capacitor 26 via the first taps TR2, TS2 and TT2. Electric power is supplied to the smoothing capacitor charging-power apparatus 34 from a second power supply PS2 different from the first power supply PS1.

In the illustrated embodiment, the second power supply PS2 is independently provided from the first power supply PS1 and has a rated voltage different from a rated voltage of the first power supply PS1. For example, the second power supply PS2 has a rated voltage lower than a rated voltage of the first power supply PS1. The second power supply PS2 can, however, have a rated voltage equal to or higher than a rated voltage of the first power supply PS1 if needed and/or desired.

In the illustrated embodiment, for example, the initial charging power is an AC voltage. The initial charging power can, however, be a DC voltage if needed and/or desired. In such an embodiment, the second power supply PS2 and the smoothing capacitor charging-power apparatus 34 can be a DC power supply such as a battery or a combination of the battery and a DC-to-DC converter.

As seen in FIG. 1, the smoothing capacitor charging-power apparatus 34 includes a charging inverter 36 electrically connected to the primary windings 20R, 20S and 20T. The charging inverter 36 is configured to supply a variable charging voltage to the primary windings 20R, 20S and 20T. The smoothing capacitor charging-power apparatus 34 further includes a charging switch circuit 38 provided between the charging inverter 36 and the transformer 14. In the illustrated embodiment, the first taps TR2, TS2 and TT2 of the primary windings 20R, 20S and 20T are electrically connected to the second power supply PS2 via the charging switch circuit 38 and the charging inverter 36. The charging switch circuit 38 is configured to electrically connect and disconnect the charging inverter 36 to and from the inverter apparatus 12. The charging switch circuit 38 includes an electromagnetic switch configured to close in response to a closing signal. Other switch circuit can, however, be provided between the second power supply PS2 and the charging inverter 36 if needed and/or desired.

As seen in FIG. 1, the inverter apparatus 12 includes an inverter controller 40. The inverter controller 40 is configured to control the main switch circuit 18, the inverter cells 16U, 16V and 16W, and the smoothing capacitor charging-power apparatus 34. The inverter controller 40 is connected to the main switch circuit 18, the inverter cells 16U, 16V and 16W, and the smoothing capacitor charging-power apparatus 34.

Figure 4:
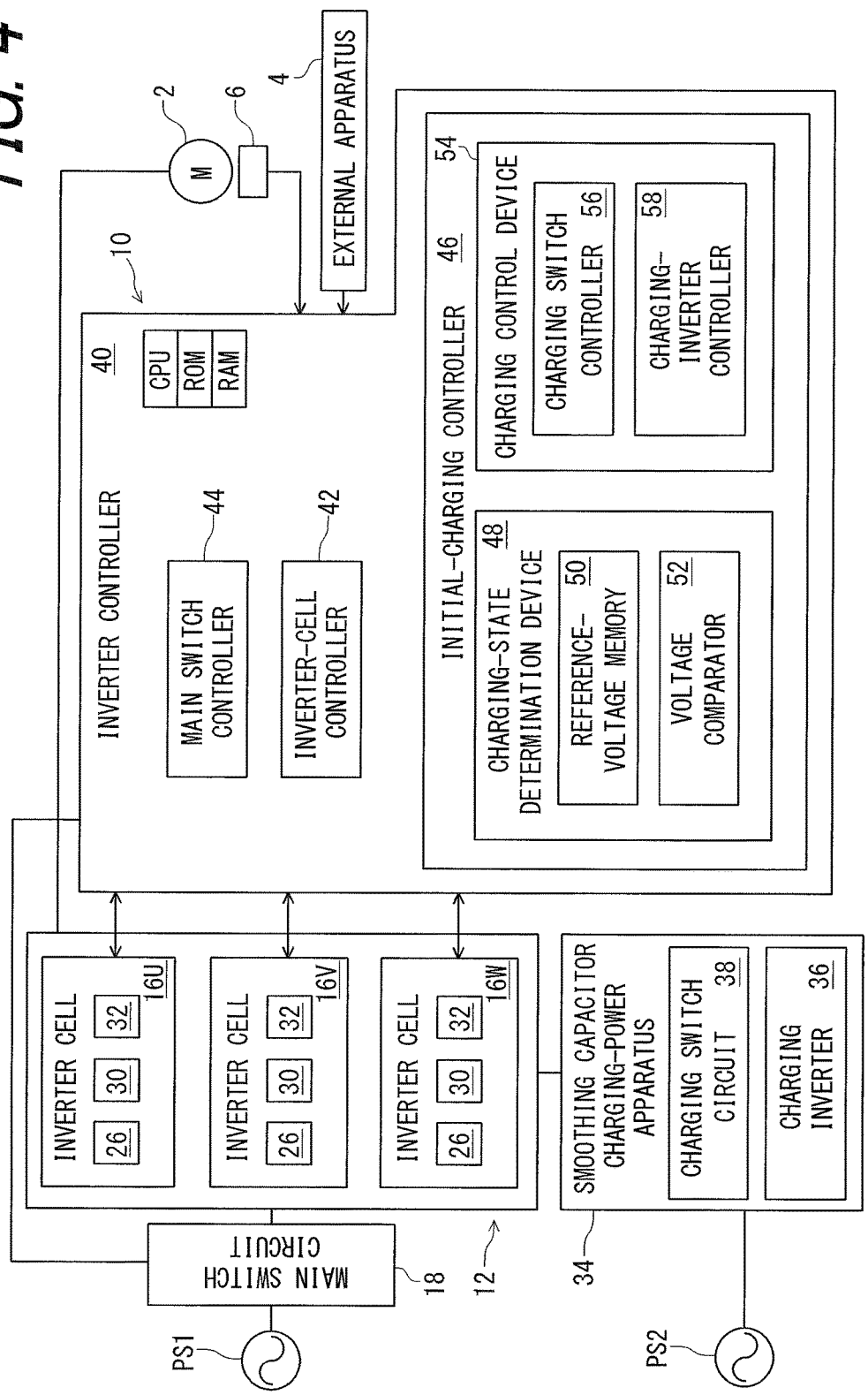
FIG. 4 is a schematic block diagram of an inverter controller provided in the inverter system illustrated in FIG. 1.

As seen in FIG. 4, the inverter controller 40 includes a processor which is equipped with a central processing unit (CPU), a read only memory (ROM), and a random access memory (RAM). For example, a program stored in the ROM is read into the CPU, and thereby various functions of the inverter controller 40 are performed. FIG. 4 illustrates functional blocks of the inverter controller 40.

The inverter controller 40 includes an inverter-cell controller 42 configured to control the inverter cells 16U, 16V and 16W to generate the variable AC voltage. The AC motor 2 includes a rotational-speed sensor 6 configured to sense a rotational speed of the AC motor 2. The inverter-cell controller 42 is configured to generate voltage commands for the inverter cells 16U, 16V and 16W based on a rotational speed command output from the external apparatus 4 and the rotational speed sensed by the rotational-speed sensor 6. For example, the inverter-cell controller 42 is configured to generate the voltage commands using proportional-integral-derivative (PID) control. The gate-signal generator 32 of each of the inverter cells 16U, 16V and 16W is configured to generate the gate signals based on the voltage command.

The inverter controller 40 further includes a main switch controller 44 configured to control the main switch circuit 18 to electrically connect and disconnect the inverter apparatus 12 to and from the first power supply PS1.

As seen in FIGS. 1 and 4, the inverter apparatus 12 further includes an initial-charging controller 46 configured to control the smoothing capacitor charging-power apparatus 34 to supply the initial charging power to the smoothing capacitor 26 via the primary windings 20R, 20S and 20T and the secondary windings 22R, 22S and 22T. More specifically, as seen in FIG. 1, the initial-charging controller 46 is configured to control the smoothing capacitor charging-power apparatus 34 to supply the initial charging power to the smoothing capacitor 26 via the primary windings 20R, 20S and 20T and the secondary windings 22R, 22S and 22T using electric power supplied from the second power supply PS2 different from the first power supply PS1. In the illustrated embodiment, the initial-charging controller 46 is provided in the inverter controller 40. The initial-charging controller 46 can, however, be separately provided from the inverter controller 40 if needed and/or desired.

As seen in FIG. 4, the initial-charging controller 46 is configured to control the smoothing capacitor charging-power apparatus 34 based on the voltage Vpn detected by the voltage detector 30. More specifically, the initial-charging controller 46 includes a charging-state determination device 48 configured to determine whether initial charging of the smoothing capacitor 26 is completed based on the voltage Vpn detected by the voltage detector 30.

In the illustrated embodiment, the charging-state determination device 48 includes a reference-voltage memory 50 and a voltage comparator 52. The reference-voltage memory 50 is configured to store a reference voltage Vref. For example, the reference voltage Vref is about 70% of a rated bus voltage of the inverter apparatus 12. The voltage comparator 52 is configured to compare at least one of the voltages Vpn detected by the voltage detectors 30 of the inverter cells 16U, 16V and 16W with the reference voltage Vref.

In the illustrated embodiment, the voltage comparator 52 is configured to compare each of the voltages Vpn with the reference voltage Vref. The charging-state determination device 48 determines that the initial charging of each of the smoothing capacitors 26 is not completed if each of the voltages Vpn is lower than the reference voltage Vref. The voltage comparator 52 can, however, be configured to compare one of the voltages Vpn (e.g., the voltage Vpn across the smoothing capacitor 26 of the inverter cell 16U) with the reference voltage Vref if needed and/or desired.

Furthermore, the charging-state determination device 48 can be configured to calculate a calculated voltage such as an average voltage, a maximum voltage and a minimum voltage based on the voltages Vpn detected by the voltage detectors 30 if needed and/or desired. In such an embodiment, the charging-state determination device 48 compares the calculated voltage with the reference voltage Vref to determine whether the initial charging of each of the smoothing capacitors 26 is completed. The charging-state determination device 48 can be configured to determine whether the initial charging of each of the smoothing capacitors 26 is completed based on a factor other than the voltage Vpn if needed and/or desired. For example, the charging-state determination device 48 can be configured to determine whether the initial charging of each of the smoothing capacitors 26 is completed based on an operating time of the smoothing capacitor charging-power apparatus 34.

As seen in FIG. 1, the initial-charging controller 46 is configured to control the smoothing capacitor charging-power apparatus 34 to start supplying the initial charging power to the smoothing capacitor 26 via the primary windings 20R, 20S and 20T and the secondary windings 22R, 22S and 22T based on a start signal output from the external apparatus 4. Possible examples of the start signal include an inverter start signal and a charging start signal. The inverter start signal is a signal for starting the inverter apparatus 12 to generate the variable AC voltage. The charging start signal is a signal for starting the initial charging of the smoothing capacitor 26 and is different from the inverter start signal. In this embodiment, the external apparatus 4 is configured to output the start signal as both of the inverter start signal and the charging start signal. The external apparatus 4 can, however, be configured to output the inverter start signal and the charging start signal as different signals As seen in FIG. 4, the initial-charging controller 46 includes a charging control device 54 configured to control the smoothing capacitor charging-power apparatus 34 to supply the initial charging power to the smoothing capacitor 26 via the primary windings 20R, 20S and 20T and the secondary windings 22R, 22S and 22T based on a determination result of the charging-state determination device 48.

More specifically, the charging control device 54 controls the smoothing capacitor charging-power apparatus 34 to start supplying the initial charging power to the smoothing capacitor 26 via the primary windings 20R, 20S and 20T and the secondary windings 22R, 22S and 22T if the charging-state determination device 48 determines that the initial charging of the smoothing capacitor 26 is not completed. The charging control device 54 controls the smoothing capacitor charging-power apparatus 34 to stop supplying the initial charging power to the smoothing capacitor 26 via the primary windings 20R, 20S and 20T and the secondary windings 22R, 22S and 22T if the charging-state determination device 48 determines that the initial charging of the smoothing capacitor 26 is completed.

In the illustrated embodiment, the charging control device 54 is configured to control the charging inverter 36 and the charging switch circuit 38 based on the determination result of the charging-state determination device 48. More specifically, the charging control device 54 includes a charging switch controller 56 and a charging-inverter controller 58. The charging switch controller 56 is configured to control the charging switch circuit 38 to electrically connect and disconnect the charging inverter 36 to and from the inverter apparatus 12. The charging-inverter controller 58 is configured to control the charging inverter 36 to supply the initial charging power to the smoothing capacitor 26 via the primary windings 20R, 20S and 20T and the secondary windings 22R, 22S and 22T.

The charging switch controller 56 controls the charging switch circuit 38 to electrically connect the charging inverter 36 to the inverter apparatus 12 if the charging-state determination device 48 determines that the initial charging of the smoothing capacitor 26 is not completed. The charging switch controller 56 controls the charging switch circuit 38 to electrically disconnect the charging inverter 36 from the inverter apparatus 12 if the charging-state determination device 48 determines that the initial charging of the smoothing capacitor 26 is completed.

The charging-inverter controller 58 controls the charging inverter 36 to start supplying the initial charging power to the smoothing capacitor 26 via the primary windings 20R, 20S and 20T and the secondary windings 22R, 22S and 22T if the charging-state determination device 48 determines that the initial charging of the smoothing capacitor 26 is not completed. The charging-inverter controller 58 controls the charging inverter 36 to stop supplying the initial charging power to the smoothing capacitor 26 via the primary windings 20R, 20S and 20T and the secondary windings 22R, 22S and 22T if the charging-state determination device 48 determines that the initial charging of the smoothing capacitor 26 is completed.

The initial-charging controller 46 is configured to control the charging inverter 36 to gradually increase the variable charging voltage. In the illustrated embodiment, the charging-inverter controller 58 of the charging control device 54 is configured to control the charging inverter 36 to gradually increase the variable charging voltage from zero to an upper limit.

The charging-inverter controller 58 is configured to generate a charging power command. The charging inverter 36 supplies the initial charging power to the primary windings 20R, 20S and 20T based on the charging power command generated by the charging-inverter controller 58. The charging power command includes a charging voltage command and a charging frequency command. The charging-inverter controller 58 gradually increases a target voltage indicated by the charging voltage command at a specific rate and gradually increases a target frequency indicated by the charging frequency command at a specific rate. The charging inverter 36 varies voltage and frequency of the initial charging power based on the charging voltage command and the charging frequency command. The increasing rate of the initial charging voltage is substantially equal to the increasing rate of the initial charging frequency. The increasing rate of the initial charging voltage can, however, be different from the increasing rate of the initial charging frequency.

The method of controlling the inverter system 10 will described in detail below referring to FIGS. 5 and 6.

In the method of controlling the inverter system 10 (more specifically, in the method of starting the inverter system 10), the initial charging power is supplied to the smoothing capacitor 26 provided in each of the inverter cells 16U, 16V and 16W via the primary windings 20R, 20S and 20T and the secondary windings 22R, 22S and 22T using electric power supplied from the second power supply PS2 prior to the supplying of the input AC voltage from the first power supply PS1 to the inverter apparatus 12.

Figure 5:
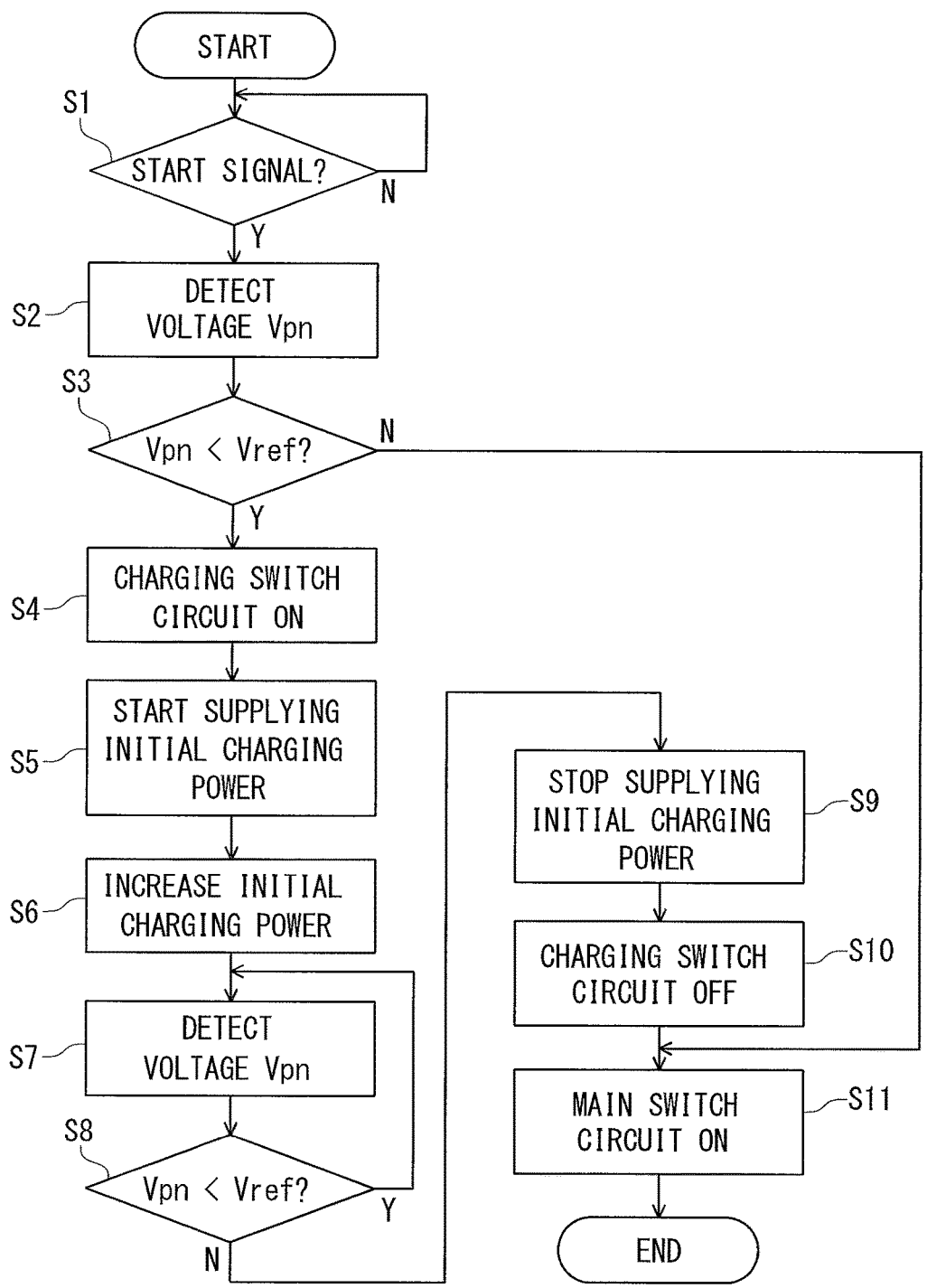
FIG. 5 is a flowchart of controlling of the inverter system illustrated in FIG. 1.

As seen in FIG. 5, in steps S1 and S2, when the start signal is input from the external apparatus 4 into the inverter controller 40, it is determined whether the initial charging of each of the smoothing capacitors 26 is completed by the charging-state determination device 48. More specifically, in step S2, the voltage Vpn across the smoothing capacitor 26 is detected by the voltage detector 30 in each of the inverter cells 16U, 16V and 16W.

In step S3, it is determined whether each of the voltages Vpn detected by the voltage detectors 30 is lower than the reference voltage Vref by the charging-state determination device 48. If each of the voltages Vpn is equal to or higher than the reference voltage Vref, it is determined that the initial charging of each of the smoothing capacitors 26 is completed, terminating the process without the initial charging.

On the other hand, in step S3, if each of the voltages Vpn is lower than the reference voltage Vref, it is determined that the initial charging of each of the smoothing capacitors 26 is not completed. In this case, the process enters step S4 in order to start the initial charging.

In step S4, the charging inverter 36 is electrically connected to the primary windings 20R, 20S and 20T of the transformer 14 by the charging switch circuit 38. More specifically, an ON signal (e.g., a closing signal) is output from the charging control device 54 to the charging switch circuit 38. As seen in FIG. 6, the charging switch circuit 38 keeps a connecting state between the charging inverter 36 and each of the primary windings 20R, 20S and 20T while the ON signal is maintained by the charging control device 54.

In step S5, the charging inverter 36 is controlled to start supplying the initial charging power to the primary windings 20R, 20S and 20T of the transformer 14 by the charging control device 54. More specifically, the charging power command is output from the charging control device 54 to the charging inverter 36. The charging inverter 36 supplies the initial charging power to the primary windings 20R, 20S and 20T based on the charging power command (e.g., the charging voltage command and the charging frequency command).

Since the secondary windings 22R, 22S and 22T are electromagnetically connected to the primary windings 20R, 20S and 20T, an intermediate charging AC voltage is generated from the initial charging power by the primary windings 20R, 20S and 20T and the secondary windings 22R, 22S and 22T. The intermediate charging AC voltage is converted to a DC voltage by the converter circuit 24 in each of the inverter cells 16U, 16V and 16W. The DC voltage converted by the converter circuit 24 is applied to the smoothing capacitor 26, which gradually accumulates electric charge in the smoothing capacitor 26 of each of the inverter cells 16U, 16V and 16W.

In step S6, the charging inverter 36 is controlled to gradually increase the initial charging power by the charging-inverter controller 58. More specifically, as seen in FIG. 6, the initial charging voltage Vic of the charging voltage command is gradually increased by the charging-inverter controller 58 at a specific rate, and the initial charging frequency Fic of the charging frequency command is gradually increased by the charging-inverter controller 58 at a specific rate. In the illustrated embodiment, the initial charging voltage Vic and the initial charging frequency Fic are linearly increased up to upper values Vmax and Fmax by the charging-inverter controller 58. At least one of the initial charging voltage Vic and the initial charging frequency Fic can, however, be nonlinearly (e.g., stepwise) increased if needed and/or desired.

In steps S7 and S8, it is determined whether the initial charging of each of the smoothing capacitors 26 is completed by the charging-state determination device 48. More specifically, in step S7, the voltage Vpn across the smoothing capacitor 26 is detected by the voltage detector 30 in each of the inverter cells 16U, 16V and 16W.

In step S8, it is determined whether each of the voltages Vpn detected by the voltage detectors 30 is lower than the reference voltage Vref by the charging-state determination device 48. If each of the voltages Vpn is lower than the reference voltage Vref, it is determined that the initial charging of each of the smoothing capacitors 26 is not completed, and the process returns to step S7 in order to continue the initial charging to the smoothing capacitors 26. Namely, in the illustrated embodiment, the voltage Vpn is periodically detected by the voltage detector 30 in each of the inverter cells 16U, 16V and 16W after the charging inverter 36 starts supplying the initial charging power. If each of the voltages Vpn is equal to or higher than the reference voltage Vref, it is determined that the initial charging of each of the smoothing capacitors 26 is completed, and the process enters step S9.

In step S9, if it is determined that the initial charging of each of the smoothing capacitors 26 is completed, the charging inverter 36 is controlled to stop supplying the initial charging power by the charging control device 54. More specifically, as seen in FIG. 6, the initial charging voltage Vic and the initial charging frequency Fic of the charging power command are reduced to zero by the charging control device 54, which causes the initial charging power to be stopped.

In step S10, after the charging inverter 36 stops supplying the initial charging power, the charging inverter 36 is electrically disconnected from the transformer 14 by the charging switch circuit 38. More specifically, the ON signal (e.g., the closing signal) sent to the charging switch circuit 38 is terminated by the charging switch controller 56. The charging switch circuit 38 electrically disconnects the charging inverter 36 from the primary windings 20R, 20S and 20T of the transformer 14 when the ON signal is terminated.

Figure 6:
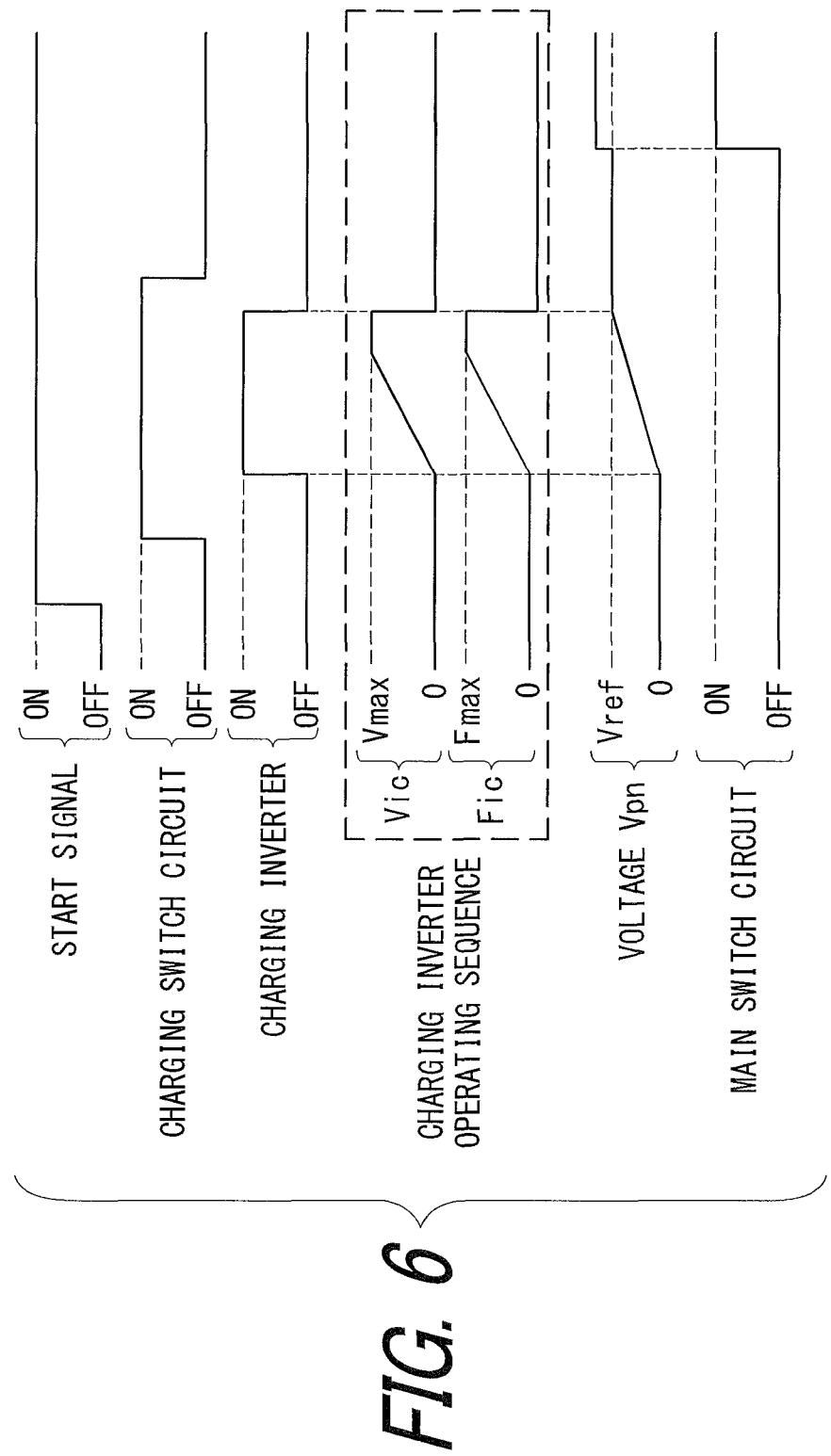
FIG. 6 is a timing chart of controlling of the inverter system illustrated in FIG. 1.

As seen in FIG. 6, after the initial charging is completed through steps S1 to S10, the inverter apparatus 12 starts generating the variable AC voltage. More specifically, in step S11, the main switch circuit 18 is controlled to electrically connect the first power supply PS1 to the inverter apparatus 12 by the main switch controller 44. For example, an ON signal (e.g., a closing signal) is output from the main switch controller 44 to the main switch circuit 18. The main switch circuit 18 keeps a connecting state between the first power supply PS1 and the inverter apparatus 12 while the ON signal is maintained by the main switch controller 44. Thus, the input AC voltage is supplied from the first power supply PS1 to the primary windings 20R, 20S and 20T of the transformer 14 of the inverter system 10 to generate the variable AC voltage using the inverter cells 16U, 16V and 16W of the inverter system 10.

As seen in FIG. 6, the voltage Vpn instantaneously increases up to an upper voltage Vpnmax when the input AC voltage is supplied to from the first power supply PS1 to the primary windings 20R, 20S and 20T. Since the smoothing capacitor 26 is charged up to the reference voltage Vref, it is possible to prevent the inverter apparatus 12 from being damaged due to flowing huge inrush current in the smoothing capacitor 26 having non-voltage.

With the inverter system 10, the input AC voltage is supplied from the first power supply PS1 to the primary windings 20R, 20S and 20T. Electric power is supplied from the second power supply PS2 different from the first power supply PS1 to the smoothing capacitor charging-power apparatus 34. Furthermore, the smoothing capacitor charging-power apparatus 34 is electrically connected to the primary windings 20R, 20S and 20T to supply the initial charging power to the smoothing capacitor 26 via the primary windings 20R, 20S and 20T and the secondary windings 22R, 22S and 22T. Accordingly, it is possible to charge the smoothing capacitor 26 via the primary windings 20R, 20S and 20T and the secondary windings 22R, 22S and 22T without providing any additional windings for charging the smoothing capacitor 26.

With the inverter apparatus 12, the initial-charging controller 46 is configured to control the smoothing capacitor charging-power apparatus 34 to supply the initial charging power to the smoothing capacitor 26 via the primary windings 20R, 20S and 20T and the secondary windings 22R, 22S and 22T using electric power supplied from the second power supply PS2. Accordingly, it is possible to charge the smoothing capacitor 26 via the primary windings 20R, 20S and 20T and the secondary windings 22R, 22S and 22T using a generalized inverter for charging the smoothing capacitor 26.

FIG. 7 shows examples of voltage classes of the charging inverter 36 corresponding to rated voltages defined on a primary side of the transformer 14 in a case where the charging inverter 36 is electrically connected to the first taps TR2, TS2 and TT2 serving as +5% taps. For example, a voltage of +5% tap is 165 V in a case where the rated voltage of the primary side of the transformer 14 is 3300 V. In this case, an inverter of 200 V class can be used as the charging inverter 36. The charging inverter 36 is not limited to the inverters listed in the FIG. 7.

With the inverter system 10, the smoothing capacitor charging-power apparatus 34 is configured to supply the initial charging power to the smoothing capacitor 26 via the first taps TR2, TS2 and TT2 other than common terminals. Accordingly, it is possible to charge the smoothing capacitor 26 via the primary windings 20R, 20S and 20T and the secondary windings 22R, 22S and 22T without providing any additional windings and/or terminals for charging the smoothing capacitor 26. This allows the smoothing capacitor 26 to be charged via the first taps TR2, TS2 and TT2 using a generalized inverter for charging the smoothing capacitor 26.

Figure 8:
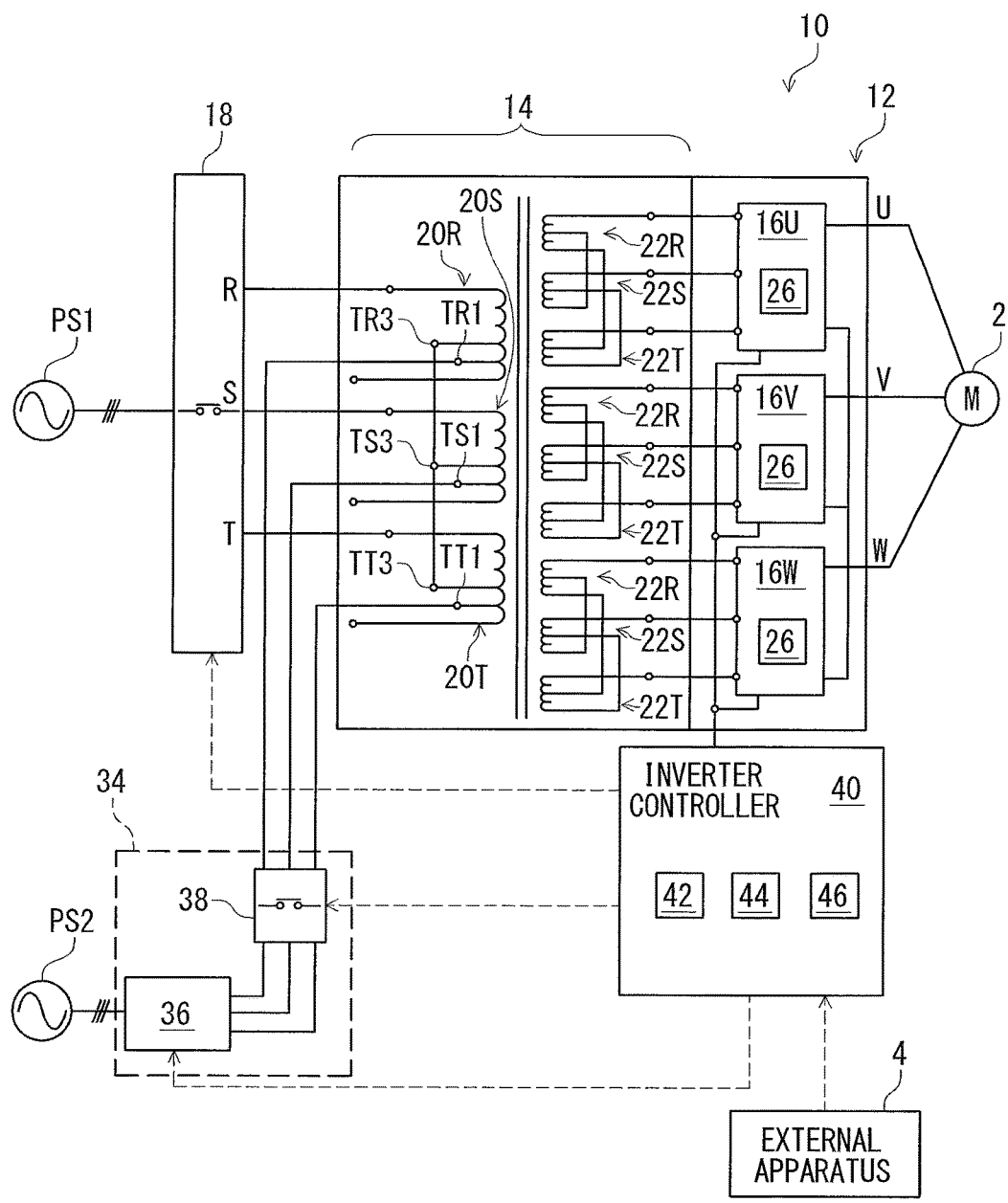
FIG. 8 is a schematic block diagram showing another exemplary outline of the inverter system according to the first embodiment.
Figure 9:
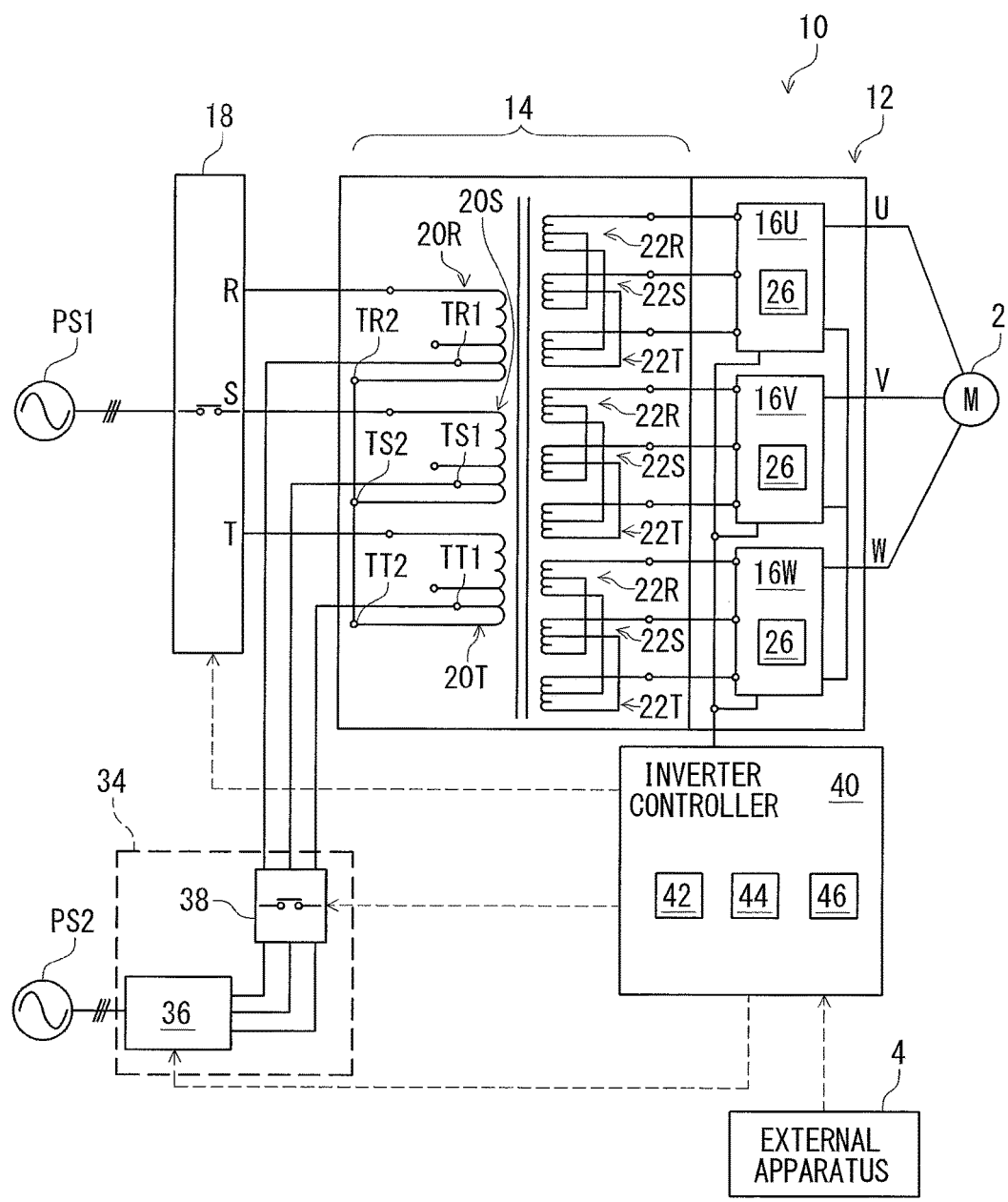
FIG. 9 is a schematic block diagram showing the other exemplary outline of the inverter system according to the first embodiment.

In the illustrated embodiment, the neutral terminals TR1, TS1 and TT1 are electrically connected to each other, and the smoothing capacitor charging-power apparatus 34 is electrically connected to the first taps TR2, TS2 and TT2. However, the arrangements of common terminals and charging terminals are not limited to the above embodiment. As seen in FIG. 8, for example, the second taps TR3, TS3 and TT3 (one example of the first terminal) can be electrically connected to each other as neutral points, and the smoothing capacitor charging-power apparatus 34 can be electrically connected to the neutral terminals TR1, TS1 and TT1 (one example of the second terminal). As seen in FIG. 9, the first taps TR2, TS2 and TT2 (one example of the first terminal) can be electrically connected to each other as neutral points, and the smoothing capacitor charging-power apparatus 34 can be electrically connected to the neutral terminals TR1, TS1 and TT1 (one example of the second terminal). Other arrangements of neutral points and charging terminals can be applied to the inverter system 10 using the neutral terminals TR1, TS1 and TT1, the first taps TR2, TS2 and TT2, and the second taps TR3, TS3 and TT3.

In the illustrated embodiment, as seen in FIG. 2, each of the secondary-winding groups WG1, WG2 and WG3 includes three secondary windings 22R, 22S and 22T. In the secondary-winding group, however, a total number of the secondary windings is not limited to the illustrated embodiment. Also, as seen in FIG. 2, the inverter apparatus 12 includes three secondary-winding groups WG1, WG2 and WG3 and three inverter cells 16U, 16V and 16W. In the inverter apparatus, however, a total number of the secondary-winding groups is not limited to the illustrated embodiment, and a total number of the inverter cells is not limited to the illustrated embodiment. For example, a plurality of inverter cells can be provided with respect to one secondary-winding group. Furthermore, a plurality of inverter cells can be provided to generate one phase voltage of the variable AC voltage. In such an embodiment, an inverter circuit of each of the inverter cells is configured to partially generate a phase voltage of the variable AC voltage from the DC voltage smoothed by a smoothing capacitor.

Second Embodiment

An inverter system 210 according to a second embodiment will be described below referring to FIGS. 10 to 12.

The inverter system 210 has substantially the same configuration as the inverter system 10 except for the initial-charging controller 46. Thus, elements having substantially the same function as those in the first embodiment will be numbered the same here, and will not be described and/or illustrated again in detail here for the sake of brevity.

Figure 10:
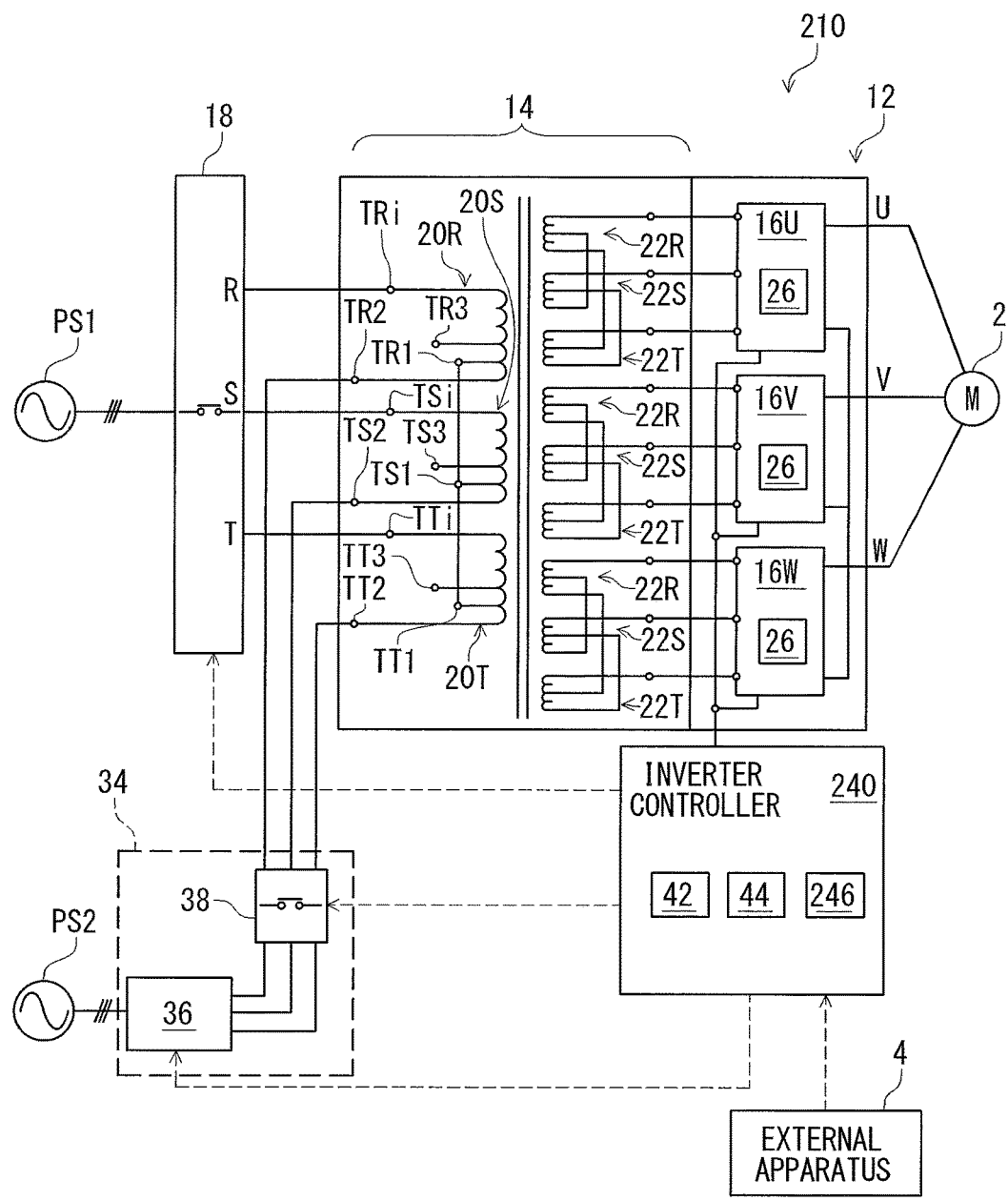
FIG. 10 is a schematic block diagram showing an outline of an inverter system according to a second embodiment.
Figure 11:
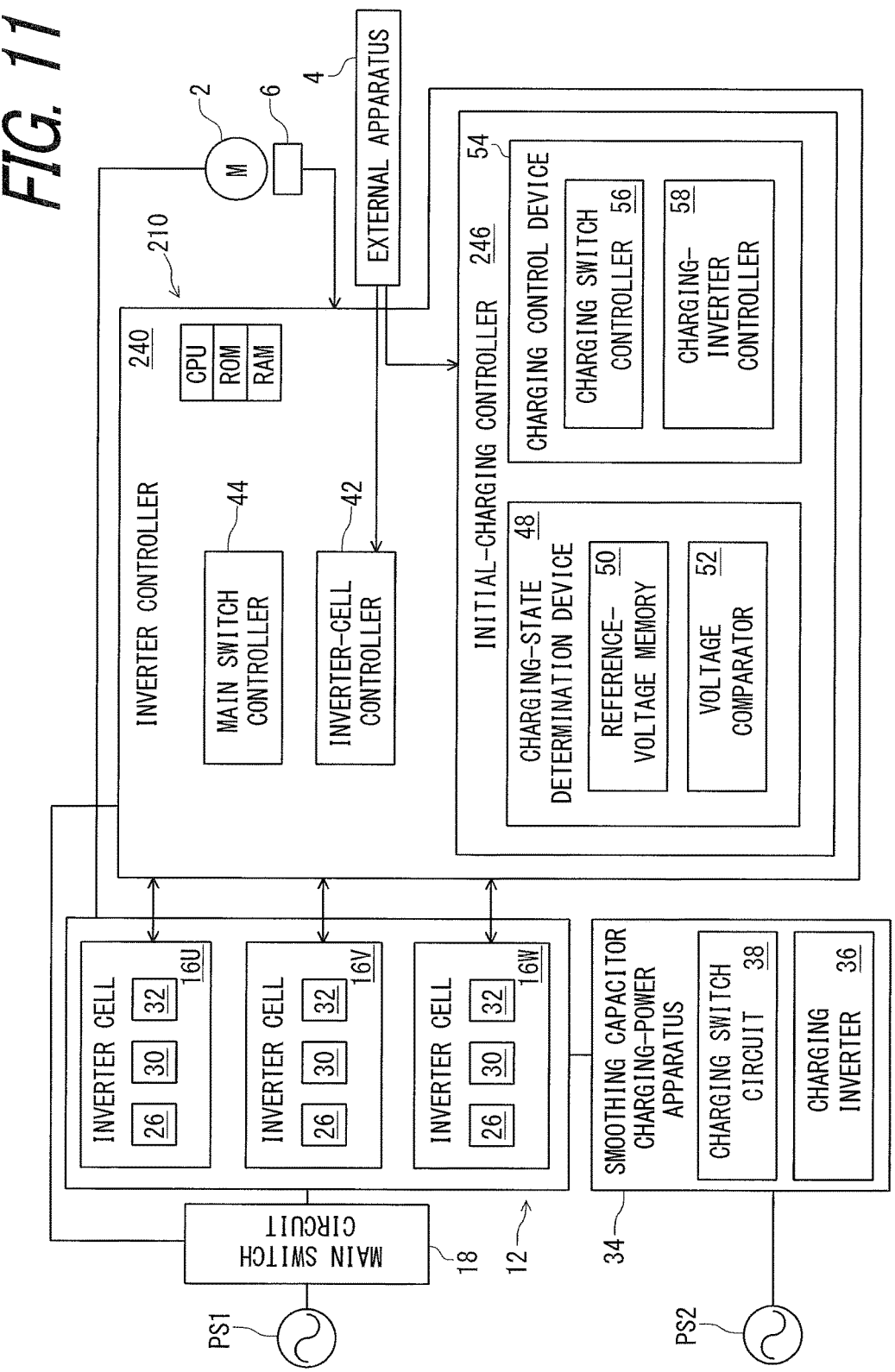
FIG. 11 is a schematic block diagram of an inverter controller provided in the inverter system illustrated in FIG. 10.

As seen in FIG. 10, the inverter controller 240 of the inverter system 210 includes an initial-charging controller 246 configured to control the smoothing capacitor charging-power apparatus 34 to supply the initial charging power to the smoothing capacitor 26 via the primary windings 20R, 20S and 20T and the secondary windings 22R, 22S and 22T.

The initial-charging controller 246 is configured to control the smoothing capacitor charging-power apparatus 34 to start supplying the initial charging power to the smoothing capacitor 26 via the primary windings 20R, 20S and 20T and the secondary windings 22R, 22S and 22T based on a start signal output from the external apparatus 4. In the illustrated embodiment, as seen in FIGS. 10 and 11, the external apparatus 4 is configured to output the inverter start signal and the charging start signal as different signals. Namely, the initial-charging controller 246 is configured to control the smoothing capacitor charging-power apparatus 34 to start supplying the initial charging power to the smoothing capacitor 26 via the primary windings 20R, 20S and 20T and the secondary windings 22R, 22S and 22T based on the charging start signal (one example of the start signal) output from the external apparatus 4. The inverter-cell controller 42 is configured to control the inverter cells 16U, 16V and 16W based on the inverter start signal output from the external apparatus 4.

The method of controlling the inverter system 210 (more specifically, the method of initially charging the smoothing capacitor 26) will be described in detail below referring to FIG. 12.

Figure 12:
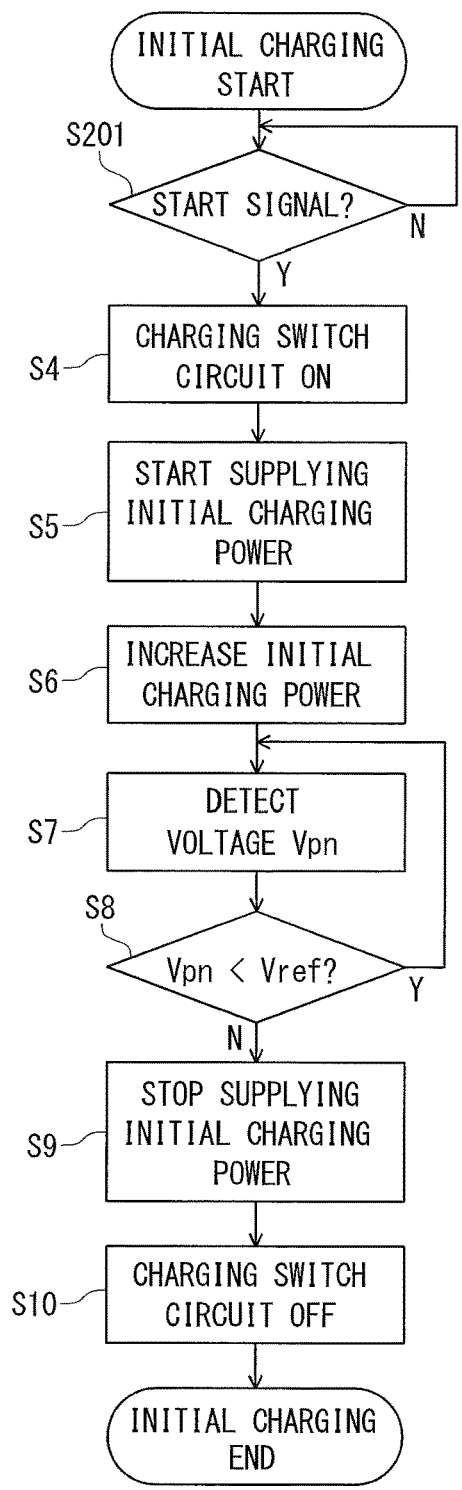
FIG. 12 is a flowchart of initial charging of a smoothing capacitor provided in the inverter cell illustrated in FIG. 10.

As seen in FIG. 12, in steps S201 and S4, when the charging start signal is input from the external apparatus 4 into the inverter controller 240, the charging inverter 36 is electrically connected to the primary windings 20R, 20S and 20T of the transformer 14 by the charging switch circuit 38. In the illustrated embodiment, the steps S2 and S3 are omitted from the method according to the first embodiment. The steps S2 and S3 can, however, be included in the method according to the second embodiment.

In step S5, the charging inverter 36 is controlled to start supplying the initial charging power to the primary windings 20R, 20S and 20T of the transformer 14 by the charging control device 54. Since the steps S4 to S10 are the same as the steps S4 to S10 according to the first embodiment, they will not be described in detail here for the sake of brevity.

With the inverter system 210, the same advantageous effects as the inverter system 10 can be obtained.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. An inverter system comprising:
an inverter apparatus comprising:
  a transformer comprising:
    primary windings to which an input alternating-current voltage is to be supplied from a first power supply, the primary windings each including a winding having an input terminal and a second terminal, the input terminal and the second terminal each being electrically connected to the winding, the input terminal being configured to be electrically connected to the first power supply; and
    secondary windings configured to be electromagnetically connected to the primary windings to generate an intermediate alternating-current voltage; and
  inverter cells configured to generate a variable alternating-current voltage from the intermediate alternating-current voltage, each of the inverter cells comprising:
    a converter circuit configured to convert the intermediate alternating-current voltage to a direct-current voltage;
    a smoothing capacitor configured to smooth the direct-current voltage; and
    an inverter circuit configured to at least partially generate a phase voltage of the variable alternating-current voltage from the direct-current voltage smoothed by the smoothing capacitor; and
a smoothing capacitor charging-power apparatus to which electric power is to be supplied from a second power supply which is different from the first power supply and which is configured to be electrically connected to the second terminals of the primary windings to supply initial charging power to the smoothing capacitor via the primary windings and the secondary windings.

2. The inverter system according to claim 1,
wherein the inverter apparatus further comprises an initial-charging controller configured to control the smoothing capacitor charging-power apparatus to supply the initial charging power to the smoothing capacitor via the primary windings and the secondary windings.

3. The inverter system according to claim 2,
wherein the initial-charging controller is configured to control the smoothing capacitor charging-power apparatus to start supplying the initial charging power to the smoothing capacitor via the primary windings and the secondary windings based on a start signal output from an external apparatus.

4. The inverter system according to claim 2,
wherein each of the inverter cells includes a voltage detector configured to detect a voltage across the smoothing capacitor, and
wherein the initial-charging controller is configured to control the smoothing capacitor charging-power apparatus based on the voltage detected by the voltage detector.

5. The inverter system according to claim 4,
wherein the initial-charging controller includes a charging-state determination device configured to determine whether initial charging of the smoothing capacitor is completed based on the voltage detected by the voltage detector.

6. The inverter system according to claim 5,
wherein the initial-charging controller includes a charging control device configured to control the smoothing capacitor charging-power apparatus to supply the initial charging power to the smoothing capacitor via the primary windings and the secondary windings based on a determination result of the charging-state determination device.

7. The inverter system according to claim 6,
wherein the charging control device controls the smoothing capacitor charging-power apparatus to start supplying the initial charging power to the smoothing capacitor via the primary windings and the secondary windings if the charging-state determination device determines that the initial charging of the smoothing capacitor is not completed.

8. The inverter system according to claim 6,
wherein the charging control device controls the smoothing capacitor charging-power apparatus to stop supplying the initial charging power to the smoothing capacitor via the primary windings and the secondary windings if the charging-state determination device determines that the initial charging of the smoothing capacitor is completed.

9. The inverter system according to claim 1,
wherein the one of the primary windings is electrically connected to the smoothing capacitor charging-power apparatus and electromagnetically connected to the secondary windings so as to be connected between the smoothing capacitor charging-power apparatus and the secondary windings via the terminal and between the first power supply and the secondary windings via the input terminal.

10. An inverter system comprising:
an inverter apparatus comprising:
  a transformer comprising:
    primary windings to which an input alternating-current voltage is to be supplied from a first power supply; and
    secondary windings configured to be electromagnetically connected to the primary windings to generate an intermediate alternating-current voltage; and
  inverter cells configured to generate a variable alternating-current voltage from the intermediate alternating-current voltage, each of the inverter cells comprising:
    a converter circuit configured to convert the intermediate alternating-current voltage to a direct-current voltage;
    a smoothing capacitor configured to smooth the direct-current voltage; and
    an inverter circuit configured to at least partially generate a phase voltage of the variable alternating-current voltage from the direct-current voltage smoothed by the smoothing capacitor; and
a smoothing capacitor charging-power apparatus to which electric power is to be supplied from a second power supply different from the first power supply and which is electrically connected to the primary windings to supply initial charging power to the smoothing capacitor via the primary windings and the secondary windings,
wherein each of the primary windings includes
  an input terminal via which the input alternating-current voltage is to be supplied from the first power supply,
  a first terminal defining a first number of turns of each of the primary windings between the input terminal and the first terminal, and
  a second terminal defining a second number of turns of each of the primary windings between the input terminal and the second terminal, the second number of turns being different from the first number of turns, and
wherein the smoothing capacitor charging-power apparatus is electrically connected to the second terminal and is configured to supply the initial charging power to the smoothing capacitor via the second terminal.

11. The inverter system according to claim 10,
wherein the second number of turns is greater than the first number of turns.

12. The inverter system according to claim 11,
wherein each of the primary windings further comprises a third terminal defining a third number of turns between the input terminal and the third terminal, and
wherein the third number of turns is less than the first number of turns.

13. An inverter system comprising:
an inverter apparatus comprising:
  a transformer comprising:
    primary windings to which an input alternating-current voltage is to be supplied from a first power supply, the primary windings each including a winding having an input terminal and a second terminal, the input terminal and the second terminal each being electrically connected to the winding, the input terminal being configured to be electrically connected to the first power supply; and
    secondary windings configured to be electromagnetically connected to the primary windings to generate an intermediate alternating-current voltage; and
  inverter cells configured to generate a variable alternating-current voltage from the intermediate alternating-current voltage, each of the inverter cells comprising:
    a converter circuit configured to convert the intermediate alternating-current voltage to a direct-current voltage;
    a smoothing capacitor configured to smooth the direct-current voltage; and
    an inverter circuit configured to at least partially generate a phase voltage of the variable alternating-current voltage from the direct-current voltage smoothed by the smoothing capacitor; and
a smoothing capacitor charging-power apparatus to which electric power is to be supplied from a second power supply different from the first power supply and which is configured to be electrically connected to the second terminals of the primary windings to supply initial charging power to the smoothing capacitor via the primary windings and the secondary windings, wherein the inverter apparatus further comprises an initial-charging controller configured to control the smoothing capacitor charging-power apparatus to supply the initial charging power to the smoothing capacitor via the primary windings and the secondary windings, and wherein the smoothing capacitor charging-power apparatus includes a charging inverter electrically connected to the primary windings and configured to supply a variable charging voltage to the primary windings.

14. The inverter system according to claim 13, wherein the initial-charging controller is configured to control the charging inverter to gradually increase the variable charging voltage.

15. An inverter apparatus comprising:
a transformer comprising:
primary windings to which an input alternating-current voltage is to be supplied from a first power supply, the primary windings each including a winding having an input terminal and a second terminal, the input terminal and the second terminal each being electrically connected to the winding, the input terminal being configured to be electrically connected to the first power supply; and
secondary windings configured to be electromagnetically connected to the primary windings to generate an intermediate alternating-current voltage;
inverter cells configured to generate a variable alternating-current voltage from the intermediate alternating-current voltage, each of the inverter cells comprising:
a converter circuit configured to convert the intermediate alternating-current voltage to a direct-current voltage;
a smoothing capacitor configured to smooth the direct-current voltage; and
an inverter circuit configured to at least partially generate a phase voltage of the variable alternating-current voltage from the direct-current voltage smoothed by the smoothing capacitor; and
an initial-charging controller configured to control a smoothing capacitor charging-power apparatus to supply initial charging power to the smoothing capacitor via the primary windings and the secondary windings using electric power supplied from a second power supply different from the first power supply to the second terminals of the primary windings.

16. The inverter apparatus according to claim 15, wherein each of the inverter cells includes a voltage detector configured to detect a voltage across the smoothing capacitor, and
wherein the initial-charging controller is configured to control the smoothing capacitor charging-power apparatus based on the voltage detected by the voltage detector.

17. The inverter apparatus according to claim 16, wherein the initial-charging controller includes a charging-state determination device configured to determine whether initial charging of the smoothing capacitor is completed based on the voltage detected by the voltage detector.

18. The inverter apparatus according to claim 17, wherein the initial-charging controller includes a charging control device configured to control the smoothing capacitor charging-power apparatus to supply the initial charging power to the smoothing capacitor via the primary windings and the secondary windings based on a determination result of the charging-state determination device.

19. The inverter apparatus according to claim 18, wherein the charging control device controls the smoothing capacitor charging-power apparatus to stop supplying the initial charging power to the smoothing capacitor via the primary windings and the secondary windings if the charging-state determination device determines that the initial charging of the smoothing capacitor is completed.

20. The inverter apparatus according to claim 18, wherein the charging control device controls the smoothing capacitor charging-power apparatus to start supplying the initial charging power to the smoothing capacitor via the primary windings and the secondary windings if the charging-state determination device determines that the initial charging of the smoothing capacitor is not completed.

21. The inverter apparatus according to claim 15, wherein the initial-charging controller is configured to control the smoothing capacitor charging-power apparatus to start supplying the initial charging power to the smoothing capacitor via the primary windings and the secondary windings based on a start signal output from an external apparatus.

22. The inverter apparatus according to claim 15, wherein the one of the primary windings is configured to be electrically connected to the smoothing capacitor charging-power apparatus and electromagnetically connected to the secondary windings so as to be connected between the smoothing capacitor charging-power apparatus and the secondary windings via the terminal and between the first power supply and the secondary windings via the input terminal.

23. An inverter apparatus comprising:
a transformer comprising:
primary windings to which an input alternating-current voltage is to be supplied from a first power supply, the primary windings each including a winding having an input terminal and a second terminal, the input terminal and the second terminal each being electrically connected to the winding, the input terminal being configured to be electrically connected to the first power supply; and
secondary windings configured to be electromagnetically connected to the primary windings to generate an intermediate alternating-current voltage;
inverter cells configured to generate a variable alternating-current voltage from the intermediate alternating-current voltage, each of the inverter cells comprising:
a converter circuit configured to convert the intermediate alternating-current voltage to a direct-current voltage;
a smoothing capacitor configured to smooth the direct-current voltage; and
an inverter circuit configured to at least partially generate a phase voltage of the variable alternating-current voltage from the direct-current voltage smoothed by the smoothing capacitor to; and
means for controlling a smoothing capacitor charging-power apparatus to supply initial charging power to the smoothing capacitor via the primary windings and the secondary windings using electric power supplied from a second power supply which is different from the first power supply, the smoothing capacitor charging-power apparatus being configured to be electrically connected to the second terminals of the primary windings.

24. The inverter apparatus according to claim 23,
wherein the one of the primary windings is configured to be electrically connected to the smoothing capacitor charging-power apparatus and electromagnetically connected to the secondary windings so as to be connected between the smoothing capacitor charging-power apparatus and the secondary windings via the terminal and between the first power supply and the secondary windings via the input terminal.

25. A method of controlling an inverter system, comprising:
supplying an input alternating-current voltage from a first power supply to primary windings of a transformer of the inverter system to generate a variable alternating-current voltage using inverter cells of the inverter system, the transformer including secondary windings configured to be electromagnetically connected to the primary windings, the primary windings each including a winding having an input terminal and a second terminal, the input terminal and the second terminal each being electrically connected to the winding, the input terminal being electrically connected to the first power supply to receive the input alternating-current voltage from the first power supply; and
supplying initial charging power to a smoothing capacitor provided in each of the inverter cells via the primary windings and the secondary windings using electric power supplied from a second power supply which is different from the first power supply and which is electrically connected to the second terminals of the primary windings prior to the supplying of the input alternating-current voltage.

26. An inverter system comprising:
an inverter apparatus comprising:
a transformer comprising:
primary windings each comprising:
an input terminal via which an input alternating-current voltage is to be supplied;
a first terminal defining a first number of turns of each of the primary windings between the input terminal and the first terminal; and
a second terminal defining a second number of turns of each of the primary windings between the input terminal and the second terminal, the second number of turns being different from the first number of turns; and
secondary windings configured to be electromagnetically connected to the primary windings to generate an intermediate alternating-current voltage; and
inverter cells configured to generate a variable alternating-current voltage from the intermediate alternating-current voltage, each of the inverter cells comprising:
a converter circuit configured to convert the intermediate alternating-current voltage to a direct-current voltage;
a smoothing capacitor configured to smooth the direct-current voltage; and
an inverter circuit configured to at least partially generate a phase voltage of the variable alternating-current voltage from the direct-current voltage smoothed by the smoothing capacitor; and
a smoothing capacitor charging-power apparatus electrically connected to the second terminal and configured to supply initial charging power to the smoothing capacitor via the second terminal.

* * * * *